April 3, 1962  O. C. HOLDERER  3,027,760
ADJUSTABLE POROUS WALLS FOR WIND TUNNELS
Filed July 25, 1957
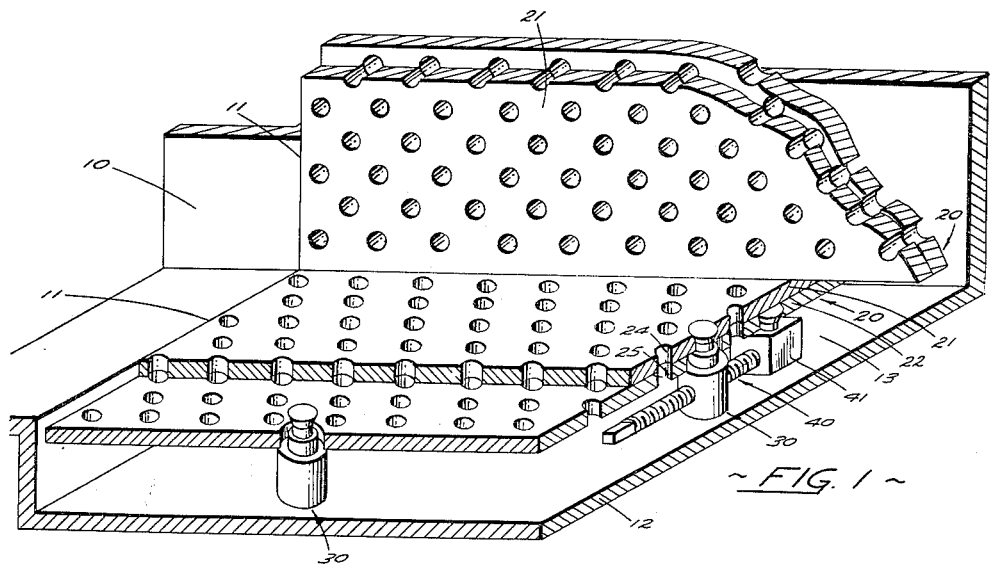
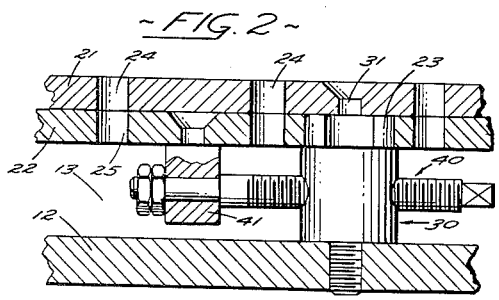 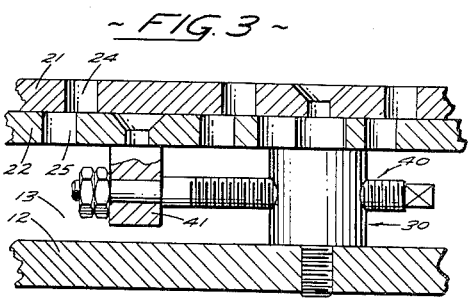
INVENTOR.
OSCAR C. HOLDERER
BY
W. E. Thibodeau and T. J. Lynch

United States Patent Office 3,027,760
Patented Apr. 3, 1962

3,027,760
ADJUSTABLE POROUS WALLS FOR WIND TUNNELS
Oscar C. Holderer, R.F.D. 3, Box 112, Huntsville, Ala.
Filed July 25, 1957, Ser. No. 674,263
2 Claims. (Cl. 73—147)
(Granted under Title 35, U.S. Code (1952), sec. 266)

The invention described herein may be manufactured and used by or for the Government for governmental purposes without payment of any royalty thereon.

This invention relates generally to transonic wind tunnels having porous walls, and more particularly, to such tunnels in which the porosity of the walls is adjustable.

Wind tunnels include sections in which bodies such as models of flight structures are disposed. To simulate conditions of flight, air is directed through the tunnels to flow over the bodies and the effect of the air flow on the models is studied to determine the effect of flight on the structures.

Shock waves are generated when air flows across portions of bodies including changes of transverse silhouette thereof.

The intensity of the shock waves generated is a function of the velocity of air flow and of the rate of change of transverse silhouette of the bodies.

Such waves are reflected from a continuous surface at substantially the intensity of the propagation and continuous walls of a wind tunnel would reflect the waves to interfere with the reaction of the test bodies.

Perforations provided in the tunnel walls provide means for escape of the boundary layer of air in the tunnels and decrease the intensity of the shock waves reflected from the walls.

Conventional tunnels are provided with perforations to reduce to a minimum the intensity of shock waves produced at the greatest air velocity applied to the tunnels. Since the perforation area increases with the air speed such tunnels operate efficiently at a single air speed.

An object of the invention is to provide a wind tunnel having walls disposed for adjustment of the porosity.

It is a further object of the invention to provide each of such walls with a pair of similarly perforated plates disposed in surface engagement, and a device for relative linear displacement of the plates to control the porosity of the wall.

A further object of this invention is to provide displacement means at opposite ends of said perforated plate so that the secondary perforated plate may be displaced against the primary plate more at one end than at another, thereby accomplishing a change of porosity which is less at one end of said plates than another. That is, it is possible to adjust the porosity of the wind tunnel walls for many desired gradients.

With the above and other objects in view that will hereinafter appear, the nature of the invention will be more clearly understood by reference to the following detailed description, the appended claims and the several views illustrated in the accompanying drawing, in which:

FIGURE 1 is a perspective view, partly in section, of an embodiment of my invention;

FIGURE 2 is an enlarged section of a wall of the embodiment of FIGURE 1 with the plates of the wall disposed for maximum porosity thereof; and FIGURE 3 is a view similar to FIGURE 2 with the plates relatively displaced to limit the porosity of the wall.

Accordingly, a wind tunnel is provided with a conduit section having solid walls 10 and a succeeding section disposed to enclose a test body. The succeeding section includes a structure 12 and walls 20 respectively including primary and secondary plates 21 and 22 in surface engagement. Primary plate 21 is mounted on a plurality of studs 30 which in turn are secured to the wind tunnel structure 12 at such intervals which are necessary to support perforated plate 21 rigidly.

The studs have sufficient height to provide a plenum chamber 13 between perforated wall 20 and wind tunnel structure 12. The plates are provided with similar perforations 24 and 25 disposed for registry to permit passage of air from the interior of the test section to chamber 13. Studs 30 are provided with respective bosses 31 and disposed at opposite ends of the plate pairs to serve as retainers for the secondary perforated plate 22. The height of boss 31 is compatible with the thickness of secondary perforated plate 22 so that it is held in close contact with primary perforated plate 21 and yet affords a sliding motion of secondary plate 22 relative to primary plate 21. Said motion, however, is limited by the size of hole 23 in secondary plate 22 which encompasses boss 31.

The displacement of secondary plate 22 is brought about by turning spindle 40. Spindle 40 is in threaded engagement with the stud 30 at one end and in longitudinally restricted engagement with swivel 41 which is fastened to secondary plate 22.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

I claim:

1. A wind tunnel comprising a conduit for flow of air therethrough, a plurality of porous plates arranged in surface engaged pairs, each of said pairs secured in sequential relation to said conduit to provide porous walls of a test section, said test section having equal corresponding parallel cross sectional areas, a plenum chamber structure secured to said conduit to enclose said test section, spacing means for securing a first plate of each of said pairs to said plenum chamber structure, displacement means secured to a second plate of each of said pairs for providing independent movement at either end of said second plate and relative movement between said first and second plates of each of said pairs thereby adjusting the porosity of said walls in selective gradients of magnitude of the porosity of said walls.

2. A device as in claim 1 in which said spacing means includes studs secured between said structure and said first plate of each of said pairs, said displacement means including swivels respectively secured to said second plate of each of said pairs and spindles respectively secured in threaded engagement between corresponding ones of said studs and swivels for adjusting the porosity of said walls, said second plate of each of said pairs including holes enclosing respective ones of said studs.

References Cited in the file of this patent

UNITED STATES PATENTS

| | | |
|---|---|---|
| 1,456,621 | Chadwick | May 29, 1923 |
| 2,360,343 | Hill | Oct. 17, 1944 |
| 2,437,741 | Hoach | Mar. 16, 1948 |
| 2,729,974 | Lee et al. | Jan. 10, 1956 |
| 2,799,161 | Greene et al. | July 16, 1957 |
| 2,861,419 | Hausmann | Nov. 25, 1958 |